(12) United States Patent
Dosedel

(10) Patent No.: US 7,967,024 B2
(45) Date of Patent: Jun. 28, 2011

(54) HYDRAULIC VALVE ASSEMBLY WITH VALVE LOCKING MECHANISM

(75) Inventor: Pavel Dosedel, Slatinice (CZ)

(73) Assignee: Clark Equipment Company, West Fargo, ND (US)

( * ) Notice: Subject to any disclaimer, the term of this patent is extended or adjusted under 35 U.S.C. 154(b) by 409 days.

(21) Appl. No.: 12/049,025

(22) Filed: Mar. 14, 2008

(65) Prior Publication Data

US 2009/0229678 A1  Sep. 17, 2009

(51) Int. Cl.
*F16K 35/00* (2006.01)
(52) U.S. Cl. ............................... 137/383; 251/99; 74/527
(58) Field of Classification Search .................. 137/383; 251/89, 95, 107, 109, 114, 116, 99, 98, 102, 251/103, 104; 74/527, 528, 532, 534, 535, 74/529

See application file for complete search history.

(56) References Cited

U.S. PATENT DOCUMENTS

| | | | |
|---|---|---|---|
| 2,147,287 A * | 2/1939 | Farmer | 251/109 |
| 3,765,520 A * | 10/1973 | Asano et al. | 192/220.1 |
| 3,938,401 A * | 2/1976 | Bauer | 74/471 R |
| 3,983,791 A | 10/1976 | Holopainen | |
| 4,098,286 A | 7/1978 | Prime | |
| 4,140,200 A | 2/1979 | Tucek | |
| 4,612,829 A | 9/1986 | Fukaya et al. | |
| 5,110,253 A | 5/1992 | Ernst et al. | |
| 5,140,865 A | 8/1992 | Foster | |
| 5,232,057 A | 8/1993 | Renard | |
| 5,277,258 A | 1/1994 | O'Dell | |
| 5,317,953 A | 6/1994 | Wentworth | |
| 5,333,449 A | 8/1994 | Takahashi et al. | |
| 5,471,839 A | 12/1995 | Hirata et al. | |
| 5,558,127 A | 9/1996 | Maruyama et al. | |
| 5,622,199 A | 4/1997 | Pieper | |
| 5,692,541 A | 12/1997 | Brown | |
| 6,289,783 B1 | 9/2001 | Sagaser et al. | |
| 6,389,922 B1 | 5/2002 | Krieger | |
| 6,722,224 B2 | 4/2004 | Nordstrom | |
| 6,886,277 B2 | 5/2005 | Yukawa et al. | |
| 2005/0274831 A1 | 12/2005 | Burdick | |

FOREIGN PATENT DOCUMENTS

| | | |
|---|---|---|
| DE | 1 035 996 | 8/1958 |
| DE | 1035996 * | 8/1958 |
| EP | 1 890 062 A1 | 7/2007 |
| WO | 92/09756 | 6/1992 |

OTHER PUBLICATIONS

Search Report and Written Opinion dated Jul. 27, 2009 for International application No. PCT/US2009/001579, filed Dec. 30, 2008.

* cited by examiner

*Primary Examiner* — John K Fristoe, Jr.
*Assistant Examiner* — Andrew J Rost
(74) *Attorney, Agent, or Firm* — John D. Veldhuis-Kroeze; Westman, Champlin & Kelly, P.A.

(57) ABSTRACT

A hydraulic valve assembly for an excavator including a hydraulic valve movable along a longitudinal axis to control a flow of fluid, a flange coupled to the hydraulic valve, the flange including a receptor, and a locking mechanism movable between a locked orientation and an unlocked orientation. In the locked orientation, the locking mechanism cooperates with the receptor to inhibit movement of the hydraulic valve along the longitudinal axis and in the unlocked orientation the hydraulic valve is free to move along the longitudinal axis.

12 Claims, 5 Drawing Sheets

HYDRAULIC VALVE ASSEMBLY WITH VALVE LOCKING MECHANISM

FIELD OF THE INVENTION

The present invention relates to a hydraulic valve assembly with a valve locking mechanism that may be used, for example, in a compact construction vehicle such as micro-excavator.

BACKGROUND

Excavators are typically equipped with a drive and steering system and a main implement, such as a boom arm with a bucket attachment. Hydraulic fluid is provided under pressure to the drive system and to the main implement by way of hydraulic pumps that are driven under the influence of an internal combustion engine.

The boom arm is raised and lowered under the influence of a lift cylinder, and the bucket is curled and dumped under the influence of a tilt cylinder. The bucket can be replaced or enhanced with various auxiliary implements, such as augers or jack hammers, which provide additional functionality to the micro-excavator. A main valve often controls the supply of hydraulic fluid to the lift cylinder, tilt cylinder, and auxiliary implements in response to actuation of a joystick or other control.

SUMMARY

In one embodiment, the invention provides a hydraulic valve assembly for an excavator. The valve assembly comprises a hydraulic valve movable along a longitudinal axis to control a flow of fluid, a flange coupled to the hydraulic valve, the flange including a receptor, and a locking mechanism movable between a locked orientation and an unlocked orientation, wherein in the locked orientation the locking mechanism cooperates with the receptor to inhibit movement of the hydraulic valve along the longitudinal axis and in the unlocked orientation the hydraulic valve is free to move along the longitudinal axis.

In another embodiment, the invention provides a hydraulic valve assembly for an excavator. The valve assembly comprises a hydraulic valve movable along a longitudinal axis to control a flow of fluid, a flange coupled to the hydraulic valve, the flange including a receptor, and elongate member pivotable about an axis transverse to the longitudinal axis between a locked orientation and an unlocked orientation, wherein in the locked orientation the elongate member cooperates with the receptor to inhibit movement of the hydraulic valve along the longitudinal axis and in the unlocked orientation the hydraulic valve is free to move along the longitudinal axis.

In another embodiment, the invention provides a method of controlling fluid flow through a hydraulic valve assembly in a construction vehicle. The method includes reciprocating a valve along a longitudinal axis for permitting a flow of fluid through the valve, pivoting a handle about an axis perpendicular to the longitudinal axis, moving an elongate member coupled to the handle along an arcuate path from an unlocked orientation to a locked orientation, engaging the elongate member in the locked orientation with a receptor coupled to the valve and inhibiting longitudinal movement of the valve while the elongate member is engaged with the receptor.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
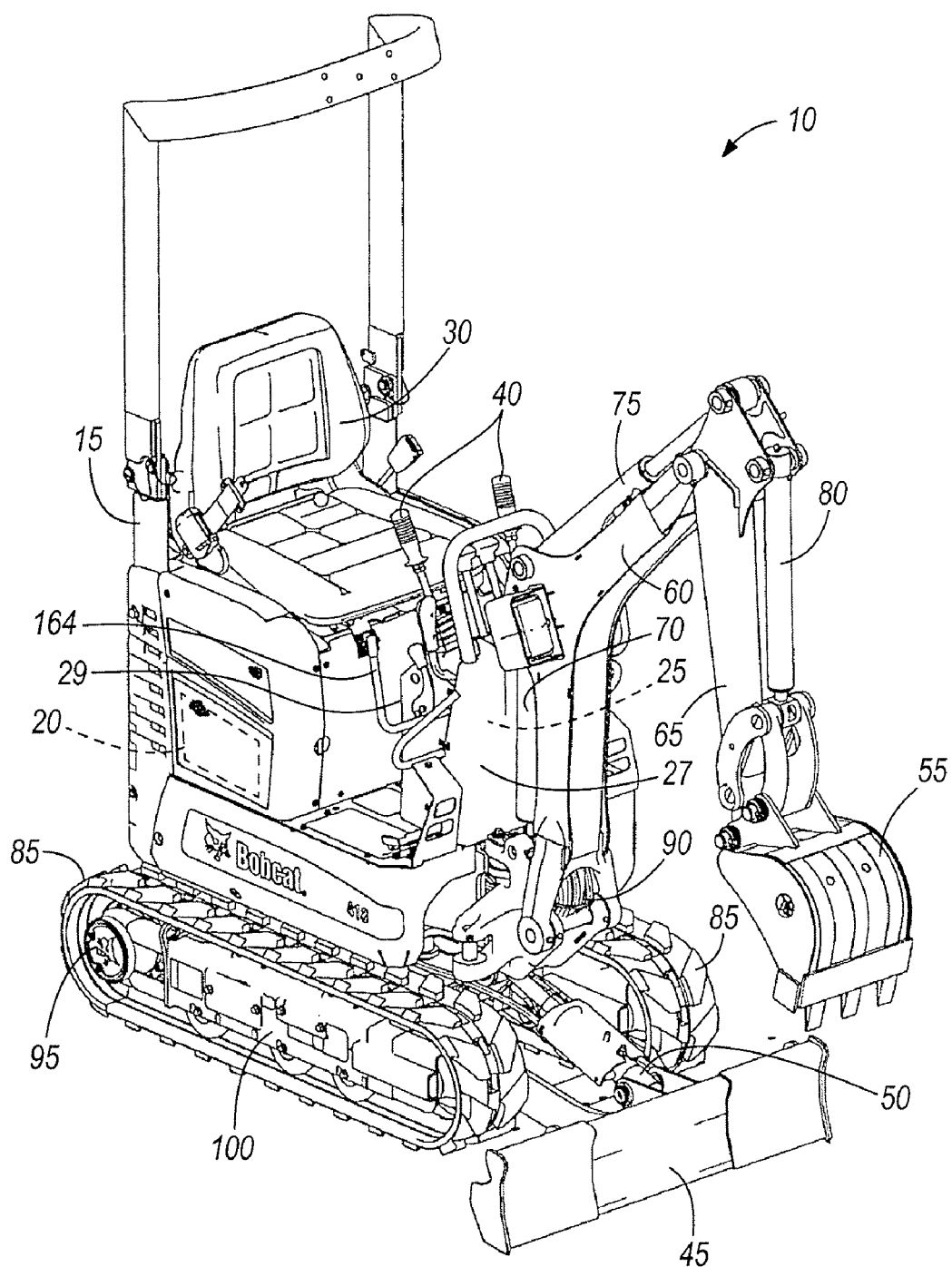
FIG. 1 is a perspective view of a construction vehicle for use with embodiments of the invention.

FIG. 1 illustrates an excavator-type construction vehicle 10 that is compact and can be referred to as a mini excavator. The illustrated excavator 10 includes a body 15 that houses an engine 20 and a hydraulic valve assembly 25. The engine 20 and hydraulic valve assembly 25 are operable to provide power and hydraulic fluid to move both the excavator 10 and various attachments. The engine 20 is positioned below an operator support 30 supported on the body 15. The hydraulic valve assembly 25 is positioned within a hydraulic housing 27 of the body 15 forward of the operator support 30, such that the operator's legs are positioned between the operator support 30 and the hydraulic housing 27. A cover 29 of the hydraulic housing 27, facing the operator's legs, resists damage to the hydraulic valve assembly 25. A plurality of operator manipulable controls, such as the illustrated joysticks 40, are positioned in front of the operator support 30 and are operable to communicate with the engine 20 and the hydraulic valve assembly 25 to control operation of the excavator 10.

A lower attachment, such as a dozer blade 45, is pivotably coupled to the body 15. A dozer lift cylinder 50 is coupled between the body 15 and the dozer blade 45 for pivoting the dozer blade 45 with respect to the body 15. The dozer blade 45 is positioned in front of the excavator 10 to help create a smooth path of travel.

An upper attachment, such as a bucket 55, is coupled to the body 15 by a boom arm 60, and an attachment arm 65. The boom arm 60 is pivotably coupled to the body 15 and is pivoted about the body 15 by a first lift cylinder 70. The attachment arm 65 is pivotably coupled to the boom arm 60 and is pivoted about the boom arm 60 by a second lift cylinder 75. The bucket 55 is pivotable coupled to the attachment arm 65 and is pivoted about the attachment arm 65 by a tilt cylinder 80.

The excavator 10 further includes left and right track assemblies 85 that are operable to support and move the excavator 10. The track assemblies 85 each include a track 87 and a track drive unit 95 for driving movement of the tracks 87. The track drive units 95 are driven by the engine 20 and the hydraulic valve assembly 25 through a plurality of conduits 90. The track drive units 95 can be motors or any other similar mechanism that can receive an input of pressurized fluid and generate an output of mechanical movement. The track assemblies 85 can further include a frame plate 100 to at least partially cover the interior of the track assemblies 85 to inhibit entry of debris.

Figure 2:
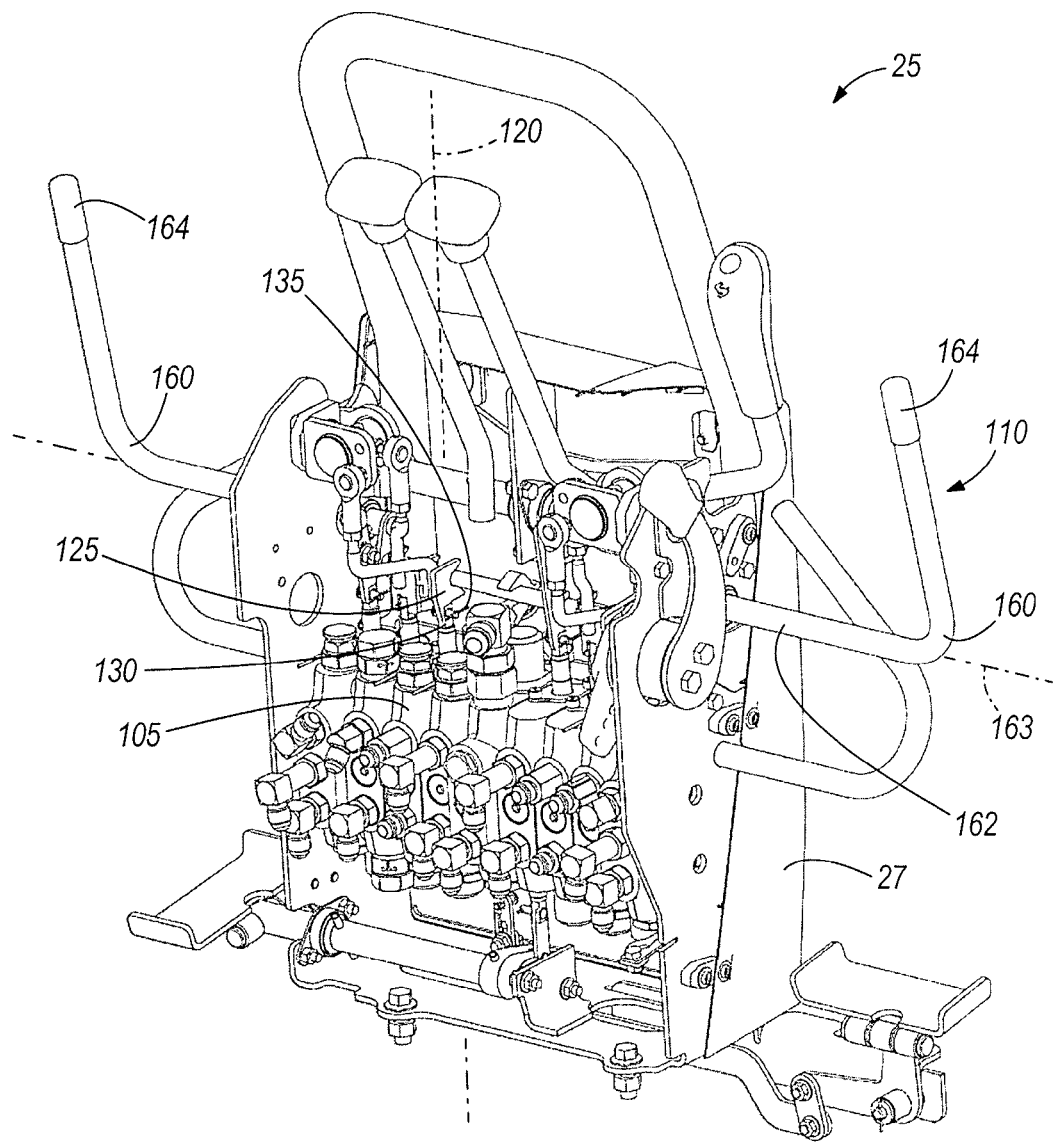
FIG. 2 is a perspective view of a hydraulic valve assembly of the construction vehicle of FIG. 2 according to one embodiment of the invention.

FIG. 2 illustrates the hydraulic valve assembly 25, which provides fluid power to the components of the excavator 10. The cover 29 from the hydraulic housing 27 shown in FIG. 1 is removed in FIG. 2 for clarity. The hydraulic valve assembly 25 includes a hydraulic valve 105 and a valve locking mechanism 110. The hydraulic valve 105 facilitates flow of hydraulic fluid through one or more of the conduits 90. The valve locking mechanism 110 is coupled to the hydraulic valve 105 for locking and unlocking operation of the hydraulic valve 105. While only a single hydraulic valve 105 is shown in FIG. 2, in other embodiments the hydraulic valve assembly 25 includes a plurality of hydraulic valves for facilitating fluid flow to the lift cylinders for the bucket 70, 75, 80 and the dozer blade 50, as well as to any other hydraulic powered components of the vehicle 10.

The hydraulic valve 105 reciprocates along a longitudinal axis 120 to communicate fluid power to the various components of the excavator 10, including, for example, the lift cylinders 70, 75, tilt cylinder 80 and the track drive units 95. The valve 105 includes a first flange 125 is coupled to a top end 130 of the hydraulic valve 105 via a fastener 135. The flange 125 is movable along the longitudinal axis 120 as the hydraulic valve 105 reciprocates along the longitudinal axis 120. The position of the valve 105 with respect to the longitudinal axis 120 can determine the flow of fluid through the valve 105. For example, in a lowered position relative to the longitudinal axis 120 the valve 105 can permit fluid flow while in a raised position relative to the longitudinal axis 120 the valve 105 can inhibit fluid flow therethrough. In other constructions, the flange 125 may couple to the hydraulic valve 105 by other securing methods, such as welding or press fitting.

Figure 5:
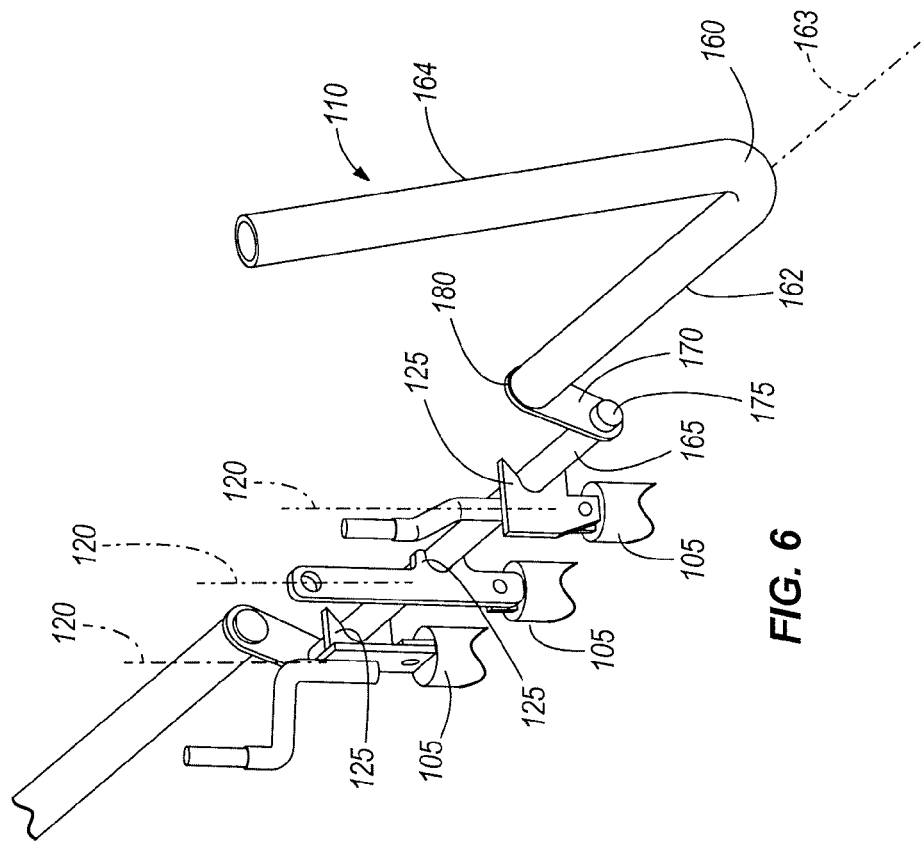
FIG. 5 is a perspective view of the valve locking mechanism in an unlocked orientation according to an embodiment of the invention.
Figure 6:
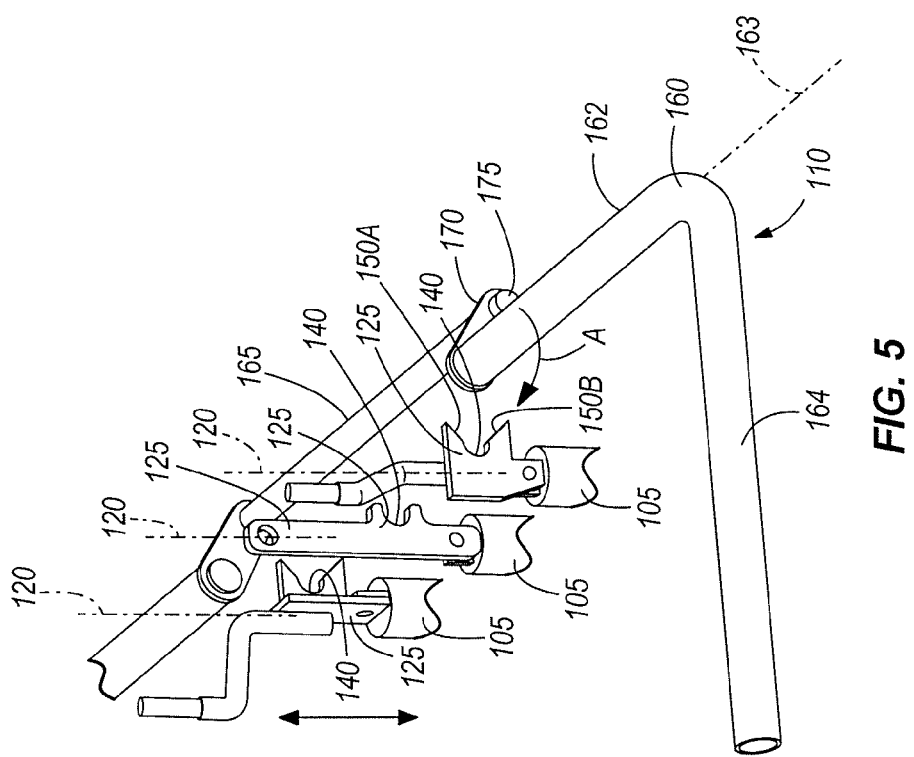
FIG. 6 is a perspective view of the valve locking mechanism of FIG. 5 in a locked position.

The valve locking mechanism 110 includes a pair of handles 160 coupled to a rod portion 165 (see FIGS. 5 and 6). The handles are L-shaped and include first portion 162 defining an axis 163 and a second portion 164 for grasping by an operator of the excavator 10. The first portions 162 of the handles 160 are located within the hydraulic valve assembly 25, while the second portions 164 protrude outside of the cover 29 of the hydraulic housing 27 (see FIG. 1). The second portions 64 of the pair of handles 160 are positioned exterior of the cover 29 to allow an operator to actuate the valve locking mechanism 110 manually. In other constructions, the pair of handles 160 may be interior or exterior of the hydraulic housing 27 and may be automatically actuated within the hydraulic housing 27. In other constructions, the pair of handles 160 may be replaced with a single handle. In addition, the handle 160 is shown with a circular cross-section however, in other embodiments the cross section may be various shapes such as rectangular, oval, flat or others not discussed herein.

Figure 3:
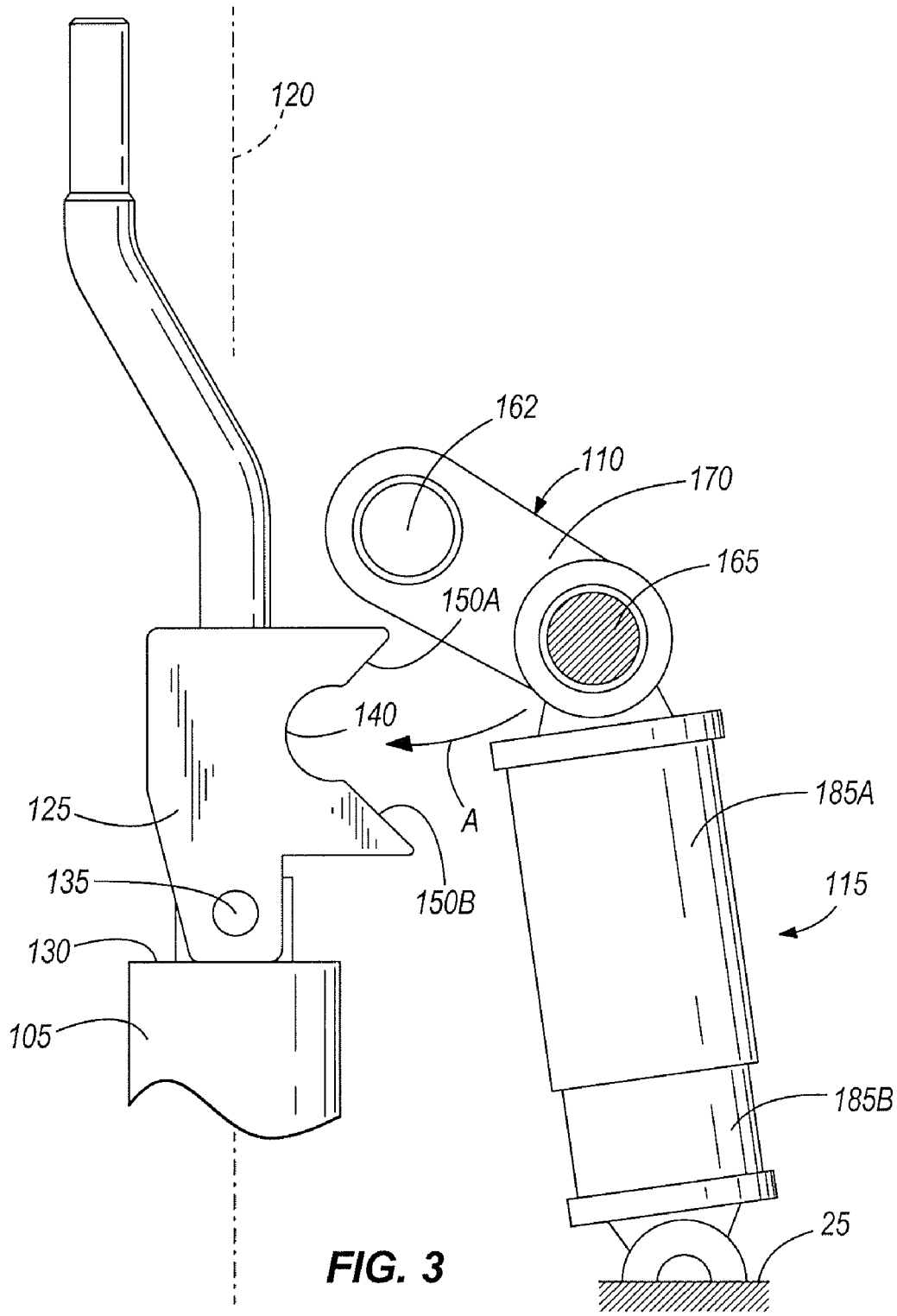
FIG. 3 is a side sectional view of the valve locking mechanism of FIG. 2 taken along line 2-2 in an unlocked orientation.
Figure 4:
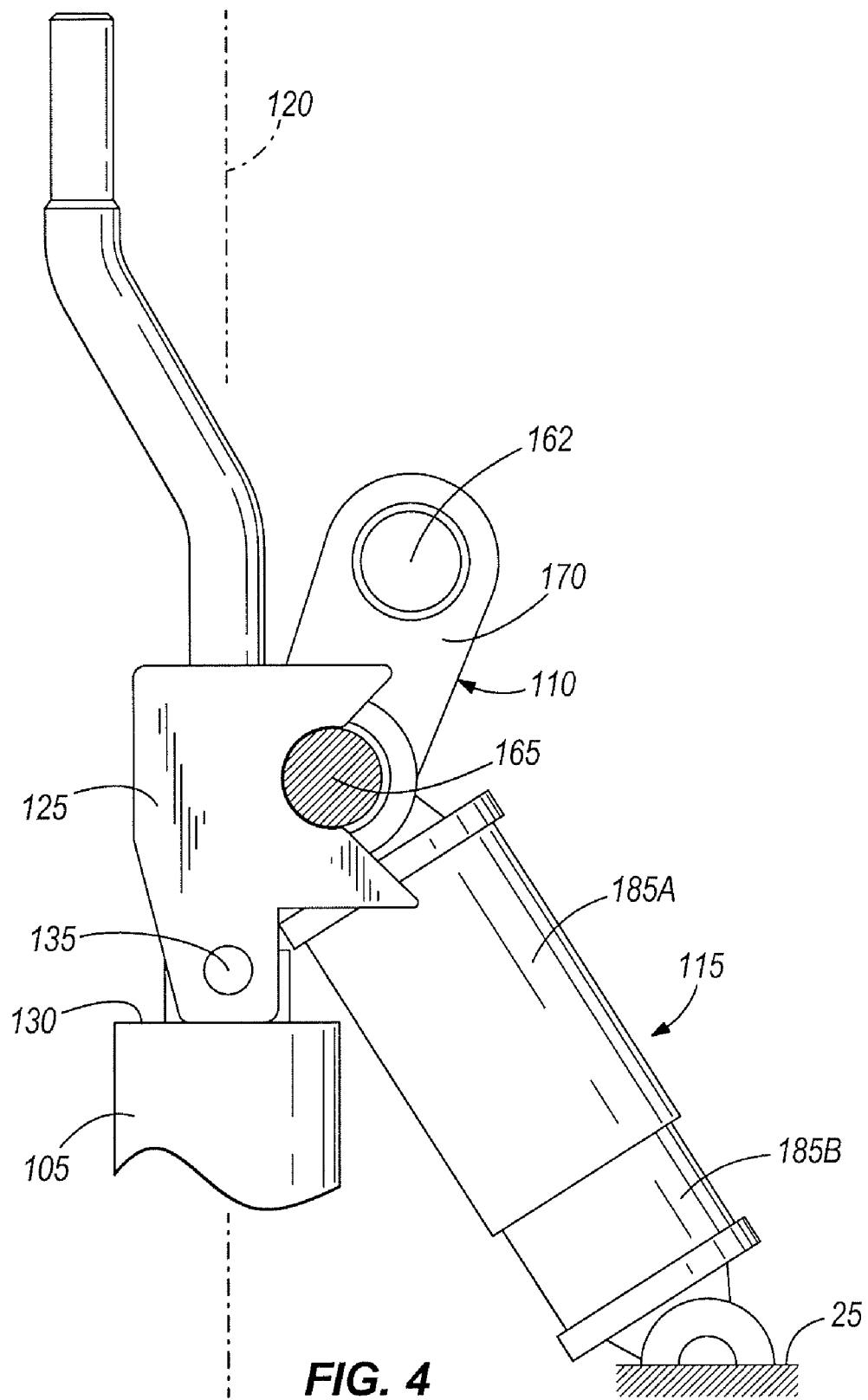
FIG. 4 is a side sectional view of the valve locking mechanism of FIG. 3 in a locked orientation.

FIGS. 3 and 4 illustrate the valve locking mechanism 110 in relation to the valve 105 with the remainder of the hydraulic valve assembly 25 removed for clarity. A link 170 couples the first portion 162 of the handle 160 to the rod portion 165. Each link 170 includes a first end 175 and a second end 180 (see FIGS. 5 and 6). The first ends 175 are coupled to the first portions 162 of the respective handles 160 while the second ends 180 are coupled to the respective ends of the rod portion 165. The first ends 175 of the links 170 pivot about the axis 163 with the first portions 162 of the handles 160. As the first ends 175 pivot, the second ends 180 travel an arced path, as indicated by arrow A, carrying the rod portion 165 between them.

The flange 125 includes a receptor 140 that is generally a V-shaped cutout in the flange 125. The receptor 140 releasably receives the rod portion 165 of the valve locking mechanism 110. Generally, the shape of the receptor 140 is defined by the size and shape of the valve locking mechanism 110. For example, in the illustrated construction, the valve locking mechanism 110 has a circular cross-section; therefore, the receptor 140 has a curved shaped. In other embodiments, the receptor 140 may form variety of cutout shapes. Although the invention shown illustrates each hydraulic valve 105 being provided with a separate flange and receptor combination, in other embodiments, multiple valves 105 can be coupled to a shared flange and receptor combination.

The valve locking assembly 110 is movable between a locked orientation, shown in FIGS. 4 and 6, and an unlocked orientation, shown in FIGS. 3 and 5. In the unlocked orientation, the handles 160 are pivoted into a horizontal orientation so that the rod portion 165 is spaced apart from the flange receptors 140. In the locked orientation, the handles 160 are pivoted into a vertical orientation so that the rod portion 165 travels towards the flanges 125 and engages the receptors 140.

Sometimes, the flange 125 is not aligned with the rod portion 165 as the rod portion 165 moves into the locked orientation. Therefore, the flange 125 can include at least one cam surface adjacent to the receptor 140. A pair of opposed cam surfaces 150A and 150B in FIG. 3 are adjacent to the receptor 140. The rod portion 165 can engage one of the cam surfaces 150A, 150B of the receptor 140 as the rod portion 165 approaches the receptor 140 along its arcuate path. Because the arcuate path of the rod portion 165 is fixed, the rod portion 165 forces the flanges 125 to reciprocate along the longitudinal axis 120 to align with the rod portion 165. In the illustrated embodiment, the cam surfaces 150A, 150B permit the valve 105 to reciprocate bi-directionally to align with the rod portion 165.

The valve locking mechanism 110 can further include a biasing mechanism 115 for biasing the rod portion 165 into a selected position. In the illustrated embodiment, the biasing mechanism 115 includes a biasing housing first portion 185A slidably coupled to a biasing housing second portion 185B. The second portion 185B slides within the first portion 185A. The first and second portions 185A, 185B define a cylindrical chamber to accommodate a compression spring (not visible). The second portion 185B is coupled to the hydraulic valve assembly 25 while the first portion 185A is coupled to the rod portion 165. The biasing mechanism 115 is over-centered such that the biasing mechanism 115 resists movement of the rod portion 165 away from the locked and unlocked orientations. In other words, in the locked orientation, the biasing mechanism 115 resists movement of the rod portion 165 out of the receptor 140, while in the unlocked orientation, the biasing mechanism 115 resists movement of the rod portion 165 towards the receptor 140. In other embodiments, the biasing mechanism 115 includes other linear or torsional biasing means.

When the valve locking mechanism 110 is in the unlocked orientation, the compression spring biases the rod portion 165 away from engagement with the receptors 140. With the rod portion 165 removed from the receptor 140, the hydraulic valve 105 is free to reciprocate along the longitudinal axis 120 and therein disperse fluid. To actuate the valve locking mechanism 110 to the locked orientation from the unlocked orientation, the operator applies a force to pivot the handle 160 in a clockwise direction against a biasing force of the biasing mechanism 115. Through continuous motion of the handle 160, the rod portion 165 travels along the arcuate path from the unlocked orientation to a neutral orientation (i.e., a position in which the biasing mechanism 115 does not bias to either the locked or unlocked orientations). Continued movement of the handles 160 past the neutral orientation triggers the biasing force of the biasing mechanism 115 to bias engagement of the rod portion 165 with the receptor 140.

In the locked orientation, the rod portion 165 locks the valve 105 into a pre-determined position along the longitudinal axis 120. The pre-determined position of the valve 105 in the locked orientation can be configured to permit fluid flow, inhibit fluid flow or otherwise affect operation of the valves 105 in a pre-determined manner. For example, in the locked orientation, the valve 105 may block fluid flow to inhibit movement of the track assemblies 85 or the attachments 45, 55.

To disengage the rod portion 165 from the receptor 140, a force is applied by the operator to pivot the handle 160 in a counter-clockwise direction. The force opposes the biasing mechanism 115 locking the rod portion 165 into the receptor 140. As the force is applied, the rod portion 165 will move out of the receptor 140, allowing the hydraulic valve 105 to resume reciprocating movement along the longitudinal axis 120. The biasing mechanism 115 biases the rod portion 165 to the unlocked orientation, away from any interaction with the movement of the hydraulic valve 105 along the longitudinal axis 120.

Although not shown in FIG. 2, the hydraulic valve assembly 25 can include a plurality of the hydraulic valves 105, each having respective flanges 125 coupled to their top ends 130. FIGS. 5 and 6 show an arrangement of a plurality of hydraulic valves 105 and respective flanges 125. Each of the valves 105 and flanges 125 is reciprocable along parallel longitudinal axes 120. As illustrated in FIGS. 5 and 6, the plurality of valves 105 can be locked through a single action of the valve locking mechanism 110.

In another construction, the flanges 125 coupled to the hydraulic valves 105 may be an adjustable coupling. For example, engaging and locking the rod portion 165 results in the hydraulic valves 105 engaging the pre-selected positions. In the event the implement or operator requires the locked position of the hydraulic valves 105 to disperse an alternate pre-selected quantity of fluid, the coupling of the flanges 125 to the hydraulic valves 105 may be adjusted to accommodate the requirement.

In another construction, the valve locking mechanism 110 may include a handle coupled to a link that causes the rod portion to slide transversely into the receptor of the flange as opposed to pivotally.

Thus, the invention provides, among other things, a hydraulic valve assembly. Various features and advantages of the invention are set forth in the following claims.

What is claimed is:

1. A hydraulic valve assembly for an excavator, the valve assembly comprising:
a hydraulic valve movable along a longitudinal axis to control a flow of fluid;
a flange coupled to the hydraulic valve, the flange including a receptor;
a locking mechanism movable between a locked orientation and an unlocked orientation, wherein the locking mechanism comprises a handle, a rod portion that can be received in the receptor and a link coupling the handle to the rod portion for causing movement between the locked orientation and the unlocked orientation, wherein in the locked orientation the locking mechanism cooperates with the receptor to inhibit movement of the hydraulic valve along the longitudinal axis and in the unlocked orientation the hydraulic valve is free to move along the longitudinal axis; and
an over-centered biasing member coupled to the locking mechanism to bias the locking mechanism in the locked orientation and in the unlocked orientation, wherein the over-centered biasing member comprises a biasing housing first portion slidably coupled to a biasing housing second portion, the first and second biasing housing portions together defining a cylinder housing, and wherein the biasing housing first portion is coupled to the hydraulic valve assembly and the biasing housing second portion is coupled to the rod portion of the locking mechanism, the over-centered biasing member resisting movement of the rod portion away from both of the locked and unlocked orientations.

2. The hydraulic valve assembly of claim 1, wherein the handle comprises a first handle portion defining an axis and coupled to a first end of the link and a second handle portion coupled to the first handle portion for grasping by an operator, a second end of the link being coupled to the rod portion of the locking mechanism, the first end of the link pivoting about the axis with the first portion of the handle, causing the second end of the link to travel an arced path with the rod portion, such that the locking mechanism is pivotable between the locked orientation and the unlocked orientation.

3. The hydraulic valve assembly of claim 1, wherein the receptor further comprises a cam surface that causes the hydraulic valve to move along the longitudinal axis to a pre-selected position when cooperating with the locking mechanism.

4. The hydraulic valve assembly of claim 3, wherein the receptor further comprises a pair of opposing cam surfaces that cause the hydraulic valve to move bi-directionally towards the pre-selected position when cooperating with the locking mechanism.

5. The hydraulic valve assembly of claim 1, wherein the receptor is a V-shaped cutout in the flange.

6. The hydraulic valve assembly of claim 1, further comprising a plurality of hydraulic valves, wherein the locking mechanism cooperates with the receptors of each hydraulic valve in the locked orientation.

7. A hydraulic valve assembly for a construction vehicle, the valve assembly comprising:
a hydraulic valve movable along a longitudinal axis to control a flow of fluid;
a flange coupled to the hydraulic valve, the flange including a receptor;
an elongate member pivotable about an axis transverse to the longitudinal axis between a locked orientation and an unlocked orientation, wherein in the locked orientation the elongate member cooperates with the receptor to inhibit movement of the hydraulic valve along the longitudinal axis and in the unlocked orientation the hydraulic valve is free to move along the longitudinal axis;
a handle coupled to the elongate member with a link; and
an over-centered biasing member coupled to the elongate member to bias the elongate member in the locked orientation and in the unlocked orientation, the over-centered biasing mechanism resisting movement of the elongate member from both of the locked orientation and the unlocked orientation, wherein the over-centered biasing member comprises a biasing housing first portion slidably coupled to a biasing housing second portion, the first and second biasing housing portions together defining a cylinder housing, and wherein the biasing housing first portion is coupled to the hydraulic valve assembly and the biasing housing second portion is coupled to the elongate member, the over-centered biasing member resisting movement of the elongate member away from both of the locked and unlocked orientations.

8. The hydraulic valve assembly of claim 7, wherein the handle comprises a first handle portion defining the axis transverse to the longitudinal axis and coupled to a first end of the link and a second handle portion coupled to the first handle portion for grasping by an operator, a second end of the link being coupled to the elongate member, the first end of the link pivoting about the axis with the first portion of the handle, causing the second end of the link to travel an arced path with the elongate member, such that the elongate member is pivotable between the locked orientation and the unlocked orientation.

9. The hydraulic valve assembly of claim 7, wherein the receptor further comprises a cam surface that causes the hydraulic valve to move along the longitudinal axis to a pre-selected position when cooperating with the elongate member.

10. The hydraulic valve assembly of claim 9, wherein the receptor further comprises a pair of opposing cam surfaces that cause the hydraulic valve to move bi-directionally towards the pre-selected position when cooperating with the elongate member.

11. The hydraulic valve assembly of claim 7, wherein the receptor is a V-shaped cutout in the flange.

12. The hydraulic valve assembly of claim 7, further comprising a plurality of hydraulic valves, wherein the elongate member cooperates with the receptors of each hydraulic valve in the locked orientation.

* * * * *